United States Patent [19]

Woods et al.

[11] Patent Number: 5,030,190
[45] Date of Patent: Jul. 9, 1991

[54] GUSSETTED PLASTIC BAGS HAVING RELIEF SEALS AND METHOD OF MAKING SAME

[75] Inventors: Timothy R. Woods, Midland; Fred Stevenson, Beaverton; R. Douglas Behr, Midland, all of Mich.

[73] Assignee: The Dow Chemical Company, Midland, Mich.

[21] Appl. No.: 446,393

[22] Filed: Dec. 5, 1989

Related U.S. Application Data

[62] Division of Ser. No. 236,056, Aug. 24, 1988, Pat. No. 4,904,093.

[51] Int. Cl.[5] .............................................. B65H 1/64
[52] U.S. Cl. .................................. 493/189; 493/254
[58] Field of Search ............... 493/194, 199, 263, 206, 493/207, 209, 231, 232, 237, 254, 341, 933, 189

[56] References Cited

U.S. PATENT DOCUMENTS 4,358,466  11/1982  Stevenson .......................... 493/189
4,761,197   8/1988  Christine et al. ................... 493/203

FOREIGN PATENT DOCUMENTS 1903307  1/1969  Fed. Rep. of Germany ...... 493/189

Primary Examiner—Frederick R. Schmidt
Assistant Examiner—Jack Lavinder

[57] ABSTRACT

A disposable or reusable and reclosable gussetted plastic bag capable of being compactly stored as a food container in freezers, yet capable of standing with an upright spout in a microwave oven for non-spill thawing and cooking of food contained in the bag. The bag is formed of two wing-shaped pouches on either side of the upright spout. The bag preferably has inner and outer skin layers of different heat sealing temperatures so that peripheral sealing is effected only with the inner skin layers, allowing the wing-shaped pouches to be formed out of a gussetted bottom without sealing of the outer skin layers of the gusset walls facing one another. Two pairs of relief seals are located adjacent each gusset joint at both edges of the bag. Each seal is positioned 45° off the gusset joint and preferably has a radius shape. The heat seals are formed by applying heat adjacent each gusset joint with a hot bar or other heat sealing device following formation of the bag.

6 Claims, 3 Drawing Sheets

GUSSETTED PLASTIC BAGS HAVING RELIEF SEALS AND METHOD OF MAKING SAME

This is a division of application Ser. No. 236, 056 filed Aug. 24, 1988, now U.S. Pat. No. 4,904,093 issued Feb. 27, 1990.

BACKGROUND OF THE INVENTION

The present invention relates to gussetted plastic bags which incorporate relief seals extending out of the existing seal positioned at the gusset joint and to a method for forming such bags. More particularly, this invention relates to a pair of relief seals formed adjacent each gusset joint between the corresponding gusset wall and lower sidewall, each relief seal is positioned below a relief line extending from the gusset joint at an angle of about 45' from the lower sidewall.

Disposable or reusable and reclosable plastic bags capable of being compactly stored as a food container in freezers, yet capable of standing with an upright spout in a microwave oven for non-spill thawing and cooking of food contained in the bag are known. In that regard, reference is made to Stevenson (U.S. Pat. No. 4,358,466), assigned to the same assignee as the present invention. Stevenson discloses a bag formed of two wing-shaped pouches on either side of an upright spout. The bag preferably has inner and outer skin layers of different heat-softening temperature responses so that peripheral sealing is effected only with the inner layers, allowing the wing-shaped pouches to be formed out of a gussetted bottom without sealing of the outer layer plies facing one another. While the Stevenson bag has a unique gussetted bag structure it has other aspects found in the typical gussetted plastic bag.

Typically, gussetted plastic bags have had problems with strength and durability at the gusset region. Seepage and pinholing are the usual results when the gussetted plastic bag is filled with product. Consequently, there has been a need to reinforce the gusset region of gussetted plastic bags. Furthermore, gussetted plastic bags have lacked the ability to stand upright when empty and when being filled with product. Consequently, there has been a need to strengthen the gusset portions of the bag to render them self-standing. Several approaches to these problems have been taken previously.

For example, Bustin (U.S. Pat. No. 4,353,497) and Sanicki (U.S. Pat. No. 4,658,433) disclose using heat seals to add strength to the bag. However, these seals waste a large portion of bag volume, and therefore reduce storage capacity. Similarly, Takahashi et al (U.S. Pat. No. 3,483,061) disclose a bag with a convex arcuate bottom for the purpose of bagging uniquely shaped products without damage to the bag. Likewise, Ericson (U.S. Pat. No. 3,508,473) describes a bottom seal which has two adjacent angular seals on either side joined by an arcuate seal into a continuous seal from one edge to the other. But, the Ericson and Takahashi et al patents both possess potential seepage and pinholing problems at the bottom corners.

As mentioned, stand-up plastic bags also often involve various forms of bag reinforcement. See for example Plate (U.S. Pat. No. 4,046,065), Kan (U.S. Pat. Nos. 3,980,225 and 4,055,109), Kugler (U.S. Pat. No. 3,395,622) and Arai (U.S. Pat. No. 3,839,128) all of which represent typical prior art relating to self-standing plastic bags. More specifically, they show attempts to reinforce gussetted regions via diagonal heat seals extending from the weak points down to the bottom of the bag. Similarly, the Kirkpatrick (G.B. Patent No. 2,047,199) patent discloses a spot heat seal which joins together all four layers of the gusset fold and wall portions. Finally, reference is made to copending application Ser. No. 171,053, filed Mar. 21, 1988, assigned to the same assignee as the present invention, which shows an improved reinforced stand-up plastic bag structure. While such stand-up plastic bags may have reinforcements in the gusset region, such reinforcements are not necessarily designed to provide additional strength and durability, but rather are generally designed to provide a more stable stand-up base.

It is perceived that additional improvements are needed in reinforcing gussetted plastic bags before consumers will have a gussetted plastic bag which withstands normal functional use. Thus, there is a need to increase bag strength and durability, especially around the gusset region, in order to prevent pinholing and seepage when the bag contains product. There is also a need for an efficient and less expensive method of making a gussetted plastic bag.

SUMMARY OF THE INVENTION

The present invention meets that need by providing an improved reinforcement for the gusset region of flexible thermoplastic plastic bags and provides a method for forming such a bag.

The gussetted plastic bag of the present invention comprises a pair of sidewalls, each having an upper sidewall and a lower sidewall. A gusset is formed by folding the lower sidewalls at a gusset crest to form gusset walls, the edges of each gusset wall and corresponding lower sidewall being joined together to form at least two pouches for containing product. Both pouches open to a spout formed by the upper sidewalls, and the ends of the gusset crest are sealed between the sidewalls to form gusset joints marking the dividing line between the upper and lower sidewalls. Furthermore, in accordance with the present invention a pair of relief seals are formed adjacent each gusset joint between the corresponding gusset walls and lower sidewalls. Each relief seal is positioned below a relief line extending from the gusset joint at an angle of about 45° from the lower sidewall. Possible relief seal shapes include: a 45° linear off the gusset joint, a semi-circular shape also 45° off the gusset joint, a rounded peak shape with sides at about 45° off the lower sidewalls and a single inverted semi-circular shape at the gusset joint. The preferred shape is the since it provides the most stress distribution and is easily mainstreamed in existing production lines.

The method of the present invention for forming a a gussetted plastic bag comprises the steps of providing a thermoplastic film material having inner and outer skin layers of different heat-sealing temperatures. By selecting an inner skin layer having a significantly lower heat sealing temperature it is possible to achieve efficient gussetted plastic bag production. Thus, when the film material is folded to form sidewalls (upper sidewalls and lower sidewalls) the two inner skin layers adjoin at all areas to be heat sealed. Then, the lower sidewalls are gussetted to form gusset walls by folding at a gusset crest. Heat is applied along the edges of the lower sidewalls and the gusset walls at a temperature above the heat sealing temperature of the inner skin layer but below that of the outer skin layer to form a spout between the upper sidewalls, gusset joints at the ends of the gusset crest, two pouches between each of the gusset walls and the corresponding lower sidewalls which open to the spout.

Finally, heat is applied at essentially the same temperature adjacent each gusset joint between the corresponding gusset walls and lower sidewalls to form a pair of relief seals. In the preferred embodiment this step takes place simultaneously with the edge sealing operation and may be accomplished by including a relief-seal forming portion on the edge heat sealing bar. Each relief seal is positioned below a relief line extending from the gusset joint at an angle of about 45° from the lower sidewall and preferably has a rounded neck shape.

Accordingly, it is an object of the present invention to provide a flexible thermoplastic bag that has a stronger and sturdier gusset region; to provide a gussetted plastic bag that is relatively leak-proof and incurs no pinholing; to provide reinforcement which does not require more raw material; and to provide an inexpensive and simple method for forming these bags. Other objects and advantages of the invention will be apparent from the following description, the accompanying drawings and the appended claims.

DETAILED DESCRIPTION OF THE PREFERRED EMBODIMENT

Figure 1:
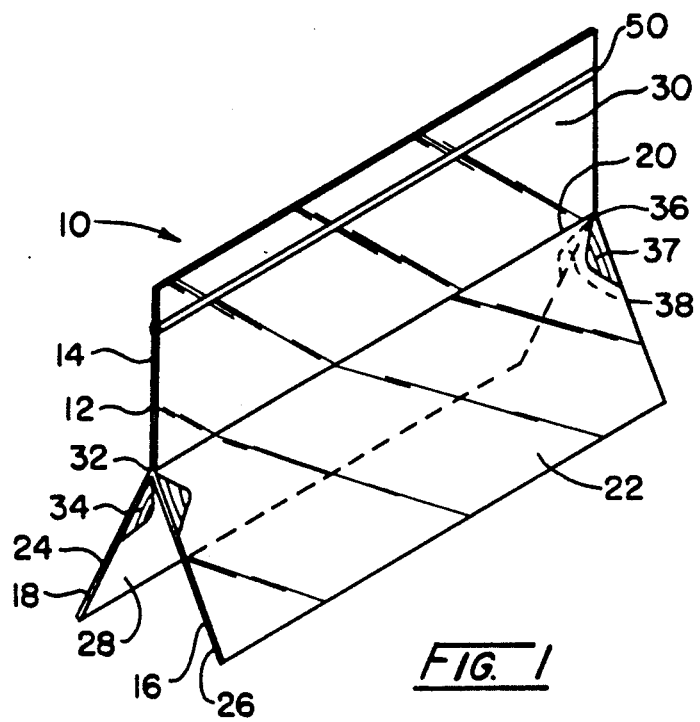
FIG. 1 is an isometric view of a gussetted plastic bag including a pair of relief seals constructed according to the present invention, with the pouches shown without any product.

Referring to FIG. 1, there is shown an isometric view of the disposable storage and cooking bag 10 which is preferably formed of a transparent or opaque thermoplastic film material. Bag 10 comprises wing sections or pouches 16 and 18 and spout section 30. Pouches 16 and 18 are separable along gusset crest 20 except at their extremities where they are sealed to close the side of spout 30. A pair of relief seals 33 and 34 are represented at front edges of pouches 16 and 18 and another pair of relief seals 37 and 38 are at the rear edges of pouches 16 and 18 as viewed in FIG. 1. The seals are part of a continuous seal on each pouch 16 and 18, which extend to the gusset joints 32 and 36. More specifically, each pouch's inner skin layer is sealed at the gusset joints 32 and 36. Similarly, the inner skin layer of spout 30 is sealed at the edges but not along gusset crest 20 and the closure means 50 near the top of FIG. 1.

Figure 1A:
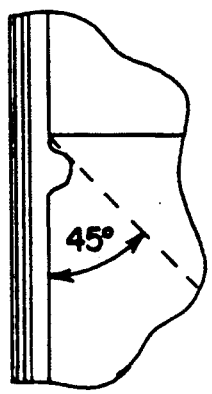
FIG. 1A is a top view of a relief seal shaped by a semi-circular shape 45° off the gusset joint.
Figure 2:
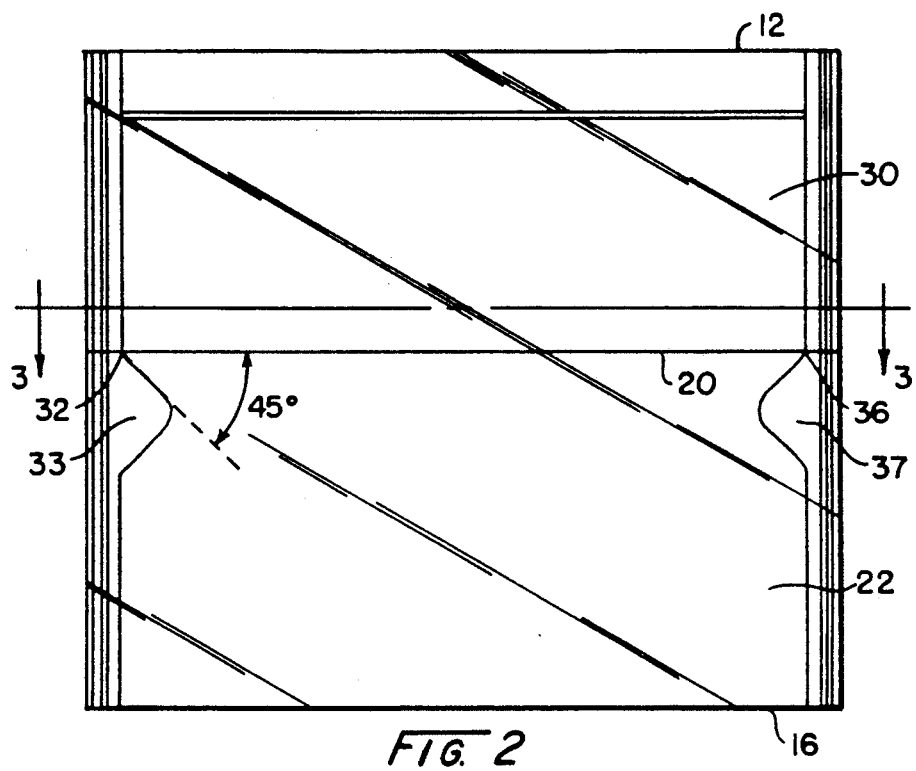
FIG. 2 is a side view of a gussetted plastic bag having a rounded neck shape relief seal 45° off the gusset joint, with the spout at the top and the pouches at the bottom of the view.

FIG. 1A shows one shape for the relief seals. Specifically, each seal is positioned 45° off each gusset joints 32 and 36 and employs a semi-circular shape. Each pair of seals entails symmetrical seals adjacent each gusset joint 32 and 36. The seal design of FIG. 2 provides the highest tolerance for the production line heat sealer. Also, this depth enables an individual to specify the tolerances for the relief and is the most aesthetic of all other plausible designs.

Figure 1B:
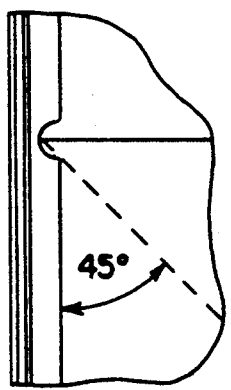
FIG. 1B is a top view of a relief seal shaped by an inverted semi-circular shape 45° off the gusset joint.

FIG. 1B illustrates an inverted radius seal also 45° off the gusset joint. This design entails a single seal rather than a pair to relieve the stress concentration. The inverted semi-circular design is not as easily employed in production as the FIG. 1A design.

Figure 1C:
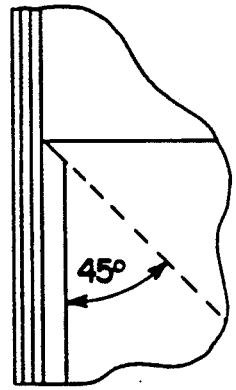
FIG. 1C is a top view of a relief seal shaped by a 45° linear off the gusset joint.

FIG. 1C shows another possible design for the relief seals. More specifically, FIG. 1C entails a simple 45° linear off the gusset. However, this design does not have the advantages of the FIG. 2 shape such as tolerance relief control and ease of mainstreaming in production.

FIG. 2 is a side view of the gussetted plastic bag showing one relief seal on each front edge 33 and 37, the relief seals having a rounded peak shape. The top of the bag is the spout 30 and the bottom is one of two pouches 16 and 18. These seals reduce the stress concentration at the gusset joints 32 and 36 and along the gusset crest 20. Shown is pouch 16 along with spout 30 which is folded along the gusset crest 20. Food or other products can fill each pouch 16 and 18 entirely and up to the level of gusset crest 20 without spillage. That is, the height of spout 30 must be at least as high as gusset crest 20 or leakage and/or splatter from the closure 50 will occur. Therefore, the spout height would preferably be 1 inch to 3 inches for a typical 8 inch by 8 inch bag.

Figure 2A:
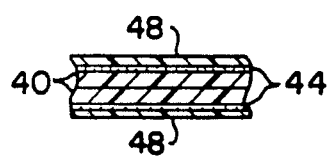
FIG. 2A is a fragmentary enlarged cross-sectional view of the multilayered structure of the bag taken along reference line 3 in FIG. 2.
Figure 3:
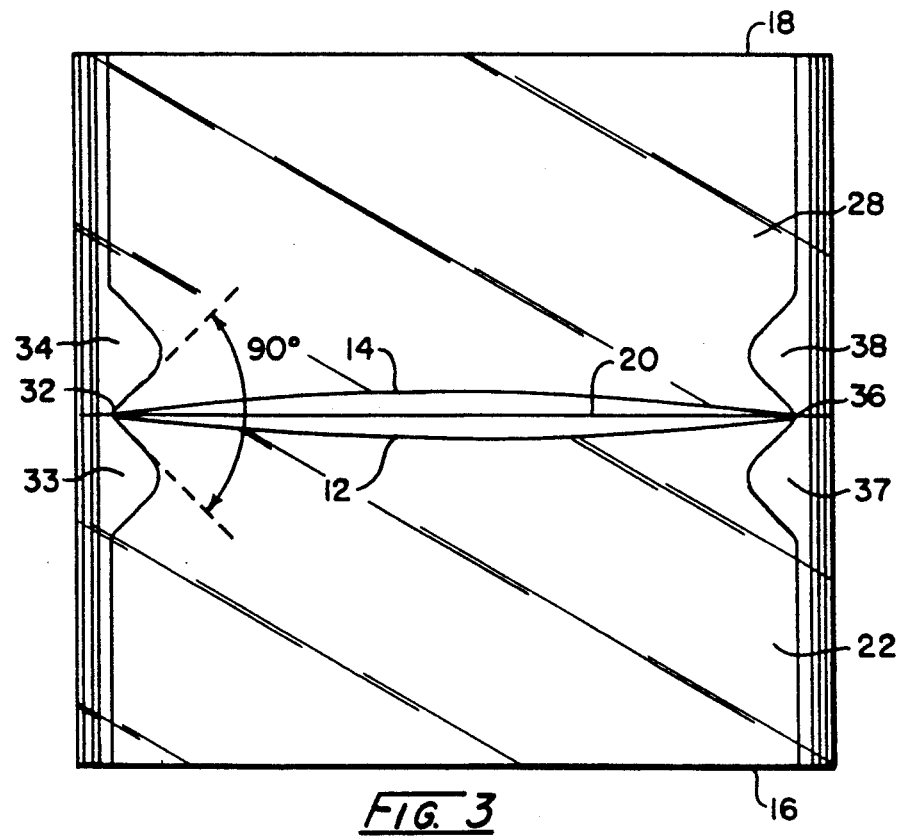
FIG. 3 is a plan view of a gussetted plastic bag showing both pairs of relief seals located at each end, both pouches and the spout section.

FIG. 3 is a plan view of bag 10. The top is pouch 18 and the bottom is pouch 16. Two pairs of relief seals are shown at 33, 34 and 37, 38 positioned at an angle about 45° off each gusset joint 32 and 36. Each pouch has an outer skin layer 48 (see FIG. 2A) on gusset walls 26 and 28 and lower sidewalls 22 and 24, as shown in FIG. 1. Both upper sidewalls 12 and 14 of spout 30 also have an outer skin layer 48.

Relief seal bar tolerances are set by increasing or decreasing the size of each relief seal 33, 34 and 37, 38. More particularly, the internal strength of bag 10 may be raised by lengthening the 45° linear off each gusset joint 32 and 36. Consequently, by lengthening each 45° linear, the area of relief seal 33, 34 and 37, 38 becomes larger, thereby distributing the high point stress located at gusset joints 32 and 36 over a wider range and increasing the internal loading capacity of bag 10.

In the bag's filled form, food or other products contained in bag 10 occupies the pouch 16 and 18. When bag 10 is fully opened out, the pouches 16 and 18 lay longitudinally on a flat surface. Gusset walls 26 an 28 do not stick together during edge sealing operations because they are either separated by a non-adhering insert during sealing of the bag edges or gusset walls 26 and 28 are formed of a material (i.e. having an outer skin layer 48) which does not seal at the temperatures at which the rest of bag 10 seals, or both.

For example, with reference to FIG. 2A walls of each pouch 16 and 18 there shown are formed of outer skin layers 48, a glue layer 44 and inner skin layers 40 which face on another in the spout 30 portions. The inner skin layers 40 can be formed of a low heat sealing temperature olefinic material while the outer skin layers 28 can be formed of a polyester or a nylon-type polyamide thermoplastic resin having heat sealing temperatures substantially in excess of the inner skin layer 40. Inner skin layers 40, if formed of a low or high density polyethylene resin, would have a heat sealing temperature of about 107° C. to 137° C. and will not become tacky during cooking. Outer skin layers 48, if formed of a typical nylon, would have a heat sealing temperature of about 215° C. or of a typical polyester such as polyethylene terephthalate, of about 250° C. The glue layer 44 can be an ionomer copolymer such as an ethylene-acrylic acid copolymer. Typically and suitable for most applications, bag 10 will have a wall thickness of about 1½ to 4 mils, the inner skin layers 40 would comprise 68% of the total thickness, the glue layer 44 14%, and the outer skin layers 48, 18%, if desired.

Figure 4:
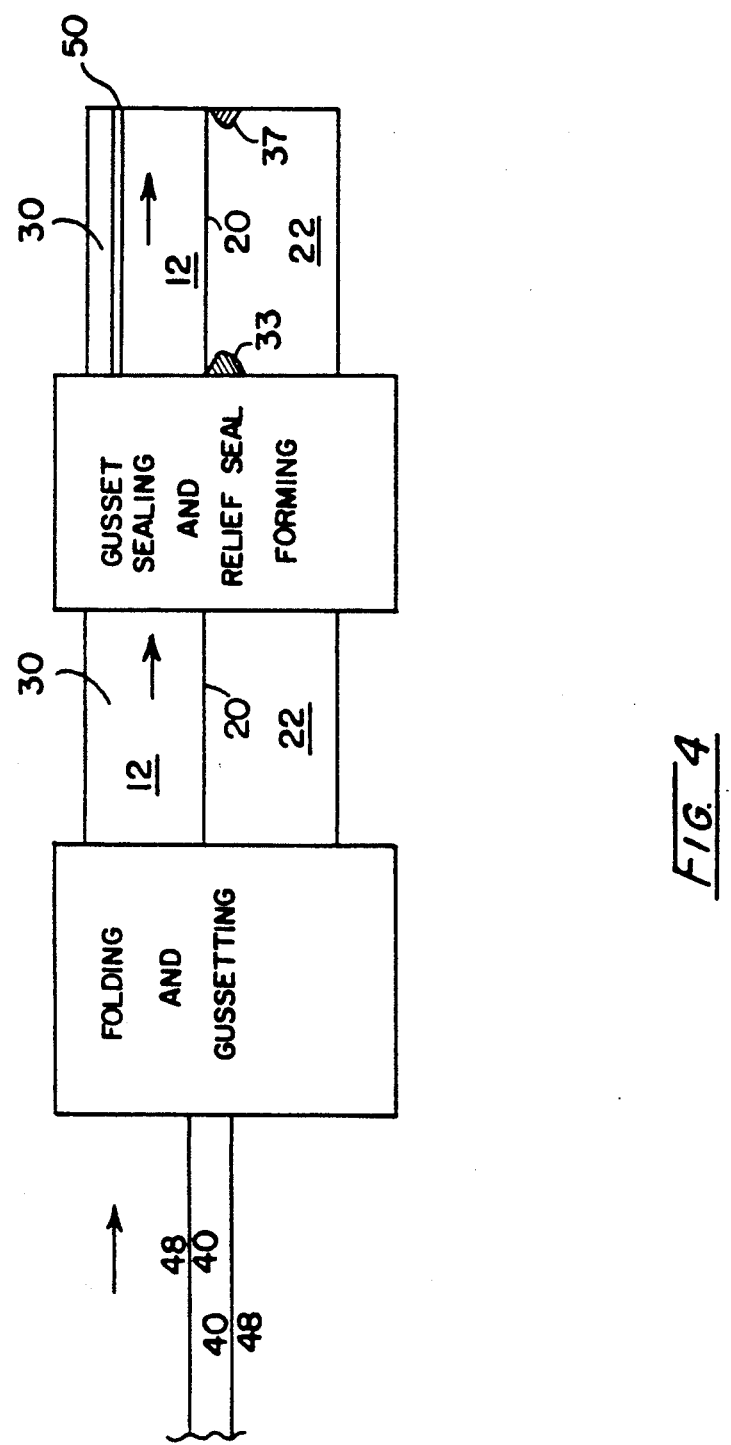
FIG. 4 illustrates schematically a preferred method of making the gussetted plastic bag of the present invention.

As illustrated in FIG. 4, the preferred process for forming bag 10 is to form it from thermoplastic film material having inner skin layer 40 and outer skin layer 48 with inner skin layer 40 having a significantly lower heat-sealing temperature than outer skin layer 48. Two plies of the thermoplastic material are layed against one another so that the inner skin layers 40 abuts against each other. The bottom sidewalls are then gussetted to form a gusset folded at gusset crest 20 and create gusset walls 26 and 28. Sidewalls 14, 24 and 12, 22, have an upper sidewalls 12 and 14 and lower sidewalls 22 and 24.

Next, heat is applied along the edges of the sidewalls 12, 22 and 14, 24 and the gusset joints 32 and 36 by a hot bar or other sealing element at a temperature above the heat sealing temperature of inner skin layer 40 but below that of the outer skin layer 48. At this temperature, sealing of the inner skin layers 40 occurs while the outer skin layers 48 fail to seal or join together. Thus, a bag 10 having pouches 16 and 18 is formed by the gusset joints 32 and 36 with the non-gussetted sections forming a central neck portion, spout 30, for the gussetted plastic bag 10 that is in open communication with the pouches 16 and 18.

Heat is then applied adjacent each gusset joint 32 and 36 between the corresponding lower sidewall 22 and gusset wall 26 and lower sidewall 24 and gusset wall 28 to form two sets of relief seals 33, 34 and 37, 38. In the preferred embodiment the hot bar or other sealing element used to seal the edges of sidewalls 12, 22 and 14, 24 also includes a relief seal portion which simultaneously forms relief seals 33, 34 and 37, 38. Each relief seal is positioned below a relief line located at gusset crest 20 extending from the gusset joint 32 and 36 at an angle of about 45° from the lower sidewalls. The relief seals 33, 34 and 37, 38 may be of several designs discussed previously and illustrated in FIG. 1A, 1B and 1C, and FIG. 2, FIG. 2 being the most desirable.

The present relief seals 33, 34 and 37, 38 may be used in any gussetted bag to relieve the high point stress located at similar gussets 32 and 36. Use of the present relief seals 33, 34 and 37, 38 are not limited to the freezer to microwave thermoplastic bags but extends to any gussetted, plastic bag.

What is claimed is:

1. A method for forming a gussetted plastic bag for containing product, said method comprising the steps of:
   (a) providing thermoplastic film material from which the bag is to be formed;
   (b) folding said thermoplastic film material to form sidewalls having upper sidewalls and lower sidewalls:
   (c) gusseting the lower sidewalls to form gusset walls folded at a gusset crest:
   (d) applying heat along the edges of said upper sidewalls to form a spout therebetween;
   (e) applying heat along the edges of each of said gusset walls and the corresponding lower sidewalls to form two pouches which open to the spout and gusset joints at the ends of the gusset crest which mark the dividing line between said upper and lower sidewalls: and
   (f) applying heat adjacent each gusset joint between said corresponding gusset wall and lower sidewall, to form a pair of relief seals, each relief seal positioned below a relief line extending from said gusset joint at an angle of about 45° from said lower sidewall; an wherein the steps of applying heat adjacent each gusset joint along with said application of heat to said upper sidewalls and applying heat to said gusset walls and corresponding sidewalls all occur simultaneously.

2. A method for forming a gussetted plastic bag for containing a product, said method comprising the steps of:
   (a) providing thermoplastic film material having inner and outer skin layers of different heat-sealing temperatures;
   (b) selecting the inner skin layer to have a significantly lower heat-sealing temperature than the outer skin layer;
   (c) folding the thermoplastic film material with opposing inner skins to form sidewalls having upper sidewalls and lower sidewalls;
   (d) gussetting said lower sidewalls to form gusset walls folded at a gusset crest; applying heat along the edges of said upper sidewalls to form a spout therebetween;
   (e) applying heat along the edges of said lower sidewalls and said gusset walls at a temperature above the heat sealing temperature of said inner skin layer but below that of said outer skin layer to form a spout between the upper sidewalls, two pouches between each of the gusset walls and the corresponding lower sidewalls which open to the spout, and gusset joints at the ends of the gusset crest which mark the dividing line between the upper and lower sidewalls; and
   (f) applying heat adjacent each gusset joint between said corresponding gusset wall and lower sidewall, to form a pair of relief seals, each relief seal positioned below a relief line extending from said gusset joint at an angle of about 45° from said lower sidewall; and wherein the steps of applying heat adjacent each gusset joint and applying heat to said upper and lower sidewalls and said gusset walls occurs simultaneously.

3. The method of claim 2 wherein said inner skin layer formed of a low heat sealing temperature olefinic material.

4. The method of claim 2 wherein said outer skin layer is formed of a thermoplastic polyamide resin.

5. The method of claim 2 wherein said inner skin layer heat sealing temperature is about 107° C. to 137° C.

6. The method of claim 5 wherein said outer skin layer heat sealing temperature is about 215° C. to 250° C.

* * * * *